United States Patent [19]

Brüggendick

[11] Patent Number: 5,405,812
[45] Date of Patent: Apr. 11, 1995

[54] METHOD AND ARRANGEMENT FOR PURIFYING A CARBON-CONTAINING ADSORPTION MEDIUM

[75] Inventor: Hermann Brüggendick, Schermbeck, Germany

[73] Assignee: Steag Aktiengesellschaft, Essen, Germany

[21] Appl. No.: 977,417

[22] PCT Filed: Jul. 20, 1991

[86] PCT No.: PCT/EP91/01367
§ 371 Date: Feb. 16, 1993
§ 102(e) Date: Feb. 16, 1993

[87] PCT Pub. No.: WO92/03224
PCT Pub. Date: Mar. 5, 1992

[30] Foreign Application Priority Data
Aug. 17, 1990 [DE] Germany ............... 40 26 071.2

[51] Int. Cl.$^6$ ............... B01J 20/34; B01J 8/08; B01D 50/00
[52] U.S. Cl. ............... 502/34; 502/20; 502/56; 502/516; 502/517; 423/210; 423/240 R; 423/244.1; 422/177; 422/216; 422/219; 96/126; 96/130; 96/146; 96/150; 588/234
[58] Field of Search ............... 502/34, 56, 516, 517; 423/210; 95/110, 111, 129, 133, 134, 137, 148; 96/146, 150, 130, 126; 422/178, 216, 29; 588/234, 235

[56] References Cited

U.S. PATENT DOCUMENTS

| 2,992,065 | 7/1961 | Fevstel et al. | 423/242.1 |
| 4,500,501 | 2/1985 | Hamada et al. | 423/239 |
| 4,620,492 | 11/1986 | Vogg et al. | 423/240 R |
| 4,708,853 | 11/1987 | Matviya et al. | 423/210 |
| 4,744,804 | 5/1988 | Furvyama | 95/111 |
| 5,260,047 | 11/1993 | Berger | 43/245.1 |

FOREIGN PATENT DOCUMENTS

| 12117 | 9/1988 | Australia | 423/210 |
| 0293688 | 12/1988 | European Pat. Off. | |
| 0376356 | 7/1990 | European Pat. Off. | |
| 3426059 | 7/1984 | Germany. | |
| 3602710 | 1/1986 | Germany. | |
| 872984 | 7/1961 | United Kingdom. | |
| 1459871 | 12/1976 | United Kingdom. | |

OTHER PUBLICATIONS

Prof. Dr. Jürgen Falbe and Prof. Dr. Manfred Regitz; Rompp Chemic Lexikon; 1990; 996–998.

Primary Examiner—Anthony McFarlane
Attorney, Agent, or Firm—Robert W. Becker & Associates

[57] ABSTRACT

In a method for purifying a carbon-containing adsorption medium used for treating flue gases within a flue gas scrubbing process the adsorption medium is introduced into an adsorption medium reactor where the adsorption medium adsorbs pollutants from the flue gas. The adsorption medium laden with pollutants is then removed from the adsorption medium reactor and conveyed into a thermal regeneration apparatus. At temperatures of 350° to 650° C. the pollutants are desorbed in the thermal regeneration apparatus, resulting in a desorption gas. In the desorbing step, pollutants in the form of heavy metals are vaporized and pollutants other than heavy metals are released from the adsorption medium and optionally decomposed. The desorption gas is then guided into an adsorption apparatus where the heavy metals are removed from the desorption gas by adsorption. The desorption gas substantially free of heavy metals is subjected to further treatment, preferably is reintroduced into the flue gas scrubbing process upstream of a flue gas scrubbing apparatus.

13 Claims, 1 Drawing Sheet

METHOD AND ARRANGEMENT FOR PURIFYING A CARBON-CONTAINING ADSORPTION MEDIUM

BACKGROUND OF THE INVENTION

The invention relates to a method for purifying a carbon-containing absorption medium that has been spent in a flue gas scrubbing process and which has been removed from a flue gas treatment reactor wherein the removed adsorption medium is subjected to a desorption process in a separate thermal regeneration/desorption apparatus for separating and decomposing pollutants and wherein the pollutant-rich desorption gas is subjected to a further treatment. Furthermore, the invention relates to an arrangement for performing this method.

With the increasing number of flue gas scrubbing devices, with respect to number and capacity the amount of adsorption medium used within such scrubbing devices has also steadily increased, these adsorption media being partially heavily loaded with pollutants. A combustion of the carbon-containing adsorption medium is not feasible or feasible only with a considerable expenditure whereby it has not been possible to date to dispose of especially heavy metals and dioxin in a suitable manner.

From U.S. Pat. No. 4,500,501 a method is known in which the separation of $SO_2$ and $NO_x$ by catalytic adsorption is performed in two serially connected moving bed reactors. The carbon-containing adsorption medium removed from the second moving bed reactor in line is regenerated in a regenerator arranged downstream, partially replaced and turned into the first flue gas treatment reactor. With this known process it is possible to reactivate the adsorption medium; on the other hand, the contents of toxic substances, especially dioxin, furane, and heavy metals, especially mercury, within the recycled adsorption medium can increase.

Under the given circumstances the pollutant-rich adsorption medium spent during flue gas scrubbing often must be disposed of at special hazardous waste depositories at a respective cost expenditure.

From German published document 3 426 059 a desorption method for carbon-containing adsorption media is known in which temperatures of more than 1000° C. are deemed necessary. In the described method there is further the danger of introducing oxygen into the desorption apparatus.

It is therefore an object of the invention to dispose of heavily polluted carbon-containing adsorption media spend during flue gas scrubbing at comparatively low costs and in an environmentally safe manner.

SUMMARY OF THE INVENTION

According to the inventive method this object is solved by: subjecting the removed adsorption medium in a separate thermal regeneration apparatus to a desorption process whereby the treatment temperature is selected such that pollutants are separated from the adsorption medium, i.e., especially dioxins are decomposed, adsorbed $SO_2$, HCl, HF, etc. are released, and mercury is vaporized; by guiding the pollutant-rich desorption gas into an adsorption apparatus and treating it by removing mercury from it; by guiding the essentially mercury-free desorption gas of the adsorption apparatus to further treatment, especially returning it into the flue gas scrubbing process.

The arrangement for performing this method is inventively characterized by providing a thermal regeneration apparatus downstream of the flue gas treatment reactor, the thermal regeneration apparatus provided with means for heating the adsorption medium, a removal unit at the bottom for removing the treated adsorption medium and a gas and steam removing device for removing the pollutant-rich adsorption gas, the gas and steam removal device connected to an adsorption apparatus which is designed to remove mercury from the desorption gas.

With the invention the adsorption medium loaded to a greater or lesser extent with pollutants is first substantially freed from pollutants in a desorption process performed by supplying heat. The thus treated adsorption medium can then be burned without further substantial expenditure or regenerated for reuse. Residues of the previously cleaned adsorption medium, after combustion, can be disposed of without problems and correspond to only small amounts.

The treatment temperature and the treatment time depend on the amount of pollutants and the desired efficiency of the desorption process. The treatment temperature in a preferred embodiment is within a temperature range of 350° to 650° C., preferably within a range between 450° and 550° C.

For comparatively inexpensive carbon-containing adsorption media, for example, for active brown coal, the expenditure of adsorption medium regeneration is in general not cost effective. Accordingly, such an adsorption medium is burned after desorption.

When using stone coal pellets as adsorption media it can however be expedient to return the spent adsorption medium into the flue gas treatment process after treatment in a thermal regeneration apparatus (desorption apparatus) and, optionally after replacement of losses, reuse it for the flue gas scrubbing process.

In a preferred embodiment of the present invention, the adsorption medium is introduced into an adsorption medium reactor where the adsorption medium adsorbs pollutants from the flue gas. The adsorption medium laden with pollutants is then removed from the adsorption medium reactor and conveyed into a thermal regeneration apparatus. At temperatures of 350° to 650° C. the pollutants in the thermal regeneration apparatus are desorbed, resulting in a desorption gas, whereby pollutants in the form of heavy metals are vaporized and pollutants other than heavy metals are released from the adsorption medium and optionally decomposed. The desorption gas is subsequently guided into an adsorption apparatus where the heavy metals are removed from the desorption gas by adsorption. The desorption gas substantially free of heavy metals is then subjected to further treatment. Advantageously, the desorption gas is recycled into the flue gas scrubbing process.

The inventively selected temperature range is sufficient to decompose dioxins and furanes, to vaporize low-boiling metals and to release adsorbed $SO_2$, HCl, HF etc. Furthermore, by indirectly heating the thermal regeneration apparatus, the introduction of oxygen into the desorption apparatus (thermal regeneration apparatus) is prevented.

Preferably, the adsorption medium is burned after desorption.

In the alternative, the adsorption medium is returned via a conveying device into the adsorption medium reactor after the desorption step.

The amount of lost adsorption medium can be replaced within the conveying device or directly within the adsorption medium reactor.

The inventive device for purifying a carbon-containing adsorption medium used for treating a flue gas stream within a flue gas scrubbing process comprises an adsorption medium reactor receiving an adsorption medium for adsorbing pollutants from the flue gas stream. The adsorption medium reactor has a removal device for removing the adsorption medium laden with pollutants from it. A thermal regeneration apparatus is connected to the removal device of the adsorption medium reactor; it serves to desorb at temperatures of 350° to 650° C. the pollutants from the adsorption medium in the form of a desorption gas, whereby the pollutants in the form of heavy metals are vaporized and pollutants other than heavy metals are released from the adsorption medium and optionally decomposed. The thermal regeneration apparatus comprises a heating means for indirectly heating (without directly supplying a heating gas) the thermal regeneration apparatus, a removal unit for removing the adsorption medium from the thermal regeneration apparatus, and a gas and steam removing device for removing the desorption gas form the thermal regeneration apparatus. The inventive device further comprises an adsorption apparatus having an inlet and an outlet. The inlet is connected to the gas and steam removing device for removing by adsorption mercury from the desorption gas. Subsequently, the desorption gas substantially free of mercury is subjected to further treatment.

The device advantageously further has a return line connected to the outlet of the adsorption apparatus for returning the desorption gas into the flue gas stream upstream of the adsorption medium reactor.

Preferably, the inventive device comprises a combustion device connected to said removal unit of said thermal regeneration apparatus.

The inventive device may further comprise a conveying device connected to the removal unit of the thermal regeneration apparatus. The removal unit is preferably located at a bottom portion of said thermal regeneration apparatus.

BRIEF DESCRIPTION OF THE DRAWING

In the following the invention will be explained in detail with the aid of the drawing showing schematically an inventive embodiment.

The only FIGURE shows an embodiment of the components participating in performing the inventive method, including a flue gas treatment reactor.

DESCRIPTION OF PREFERRED EMBODIMENTS

Figure 1:
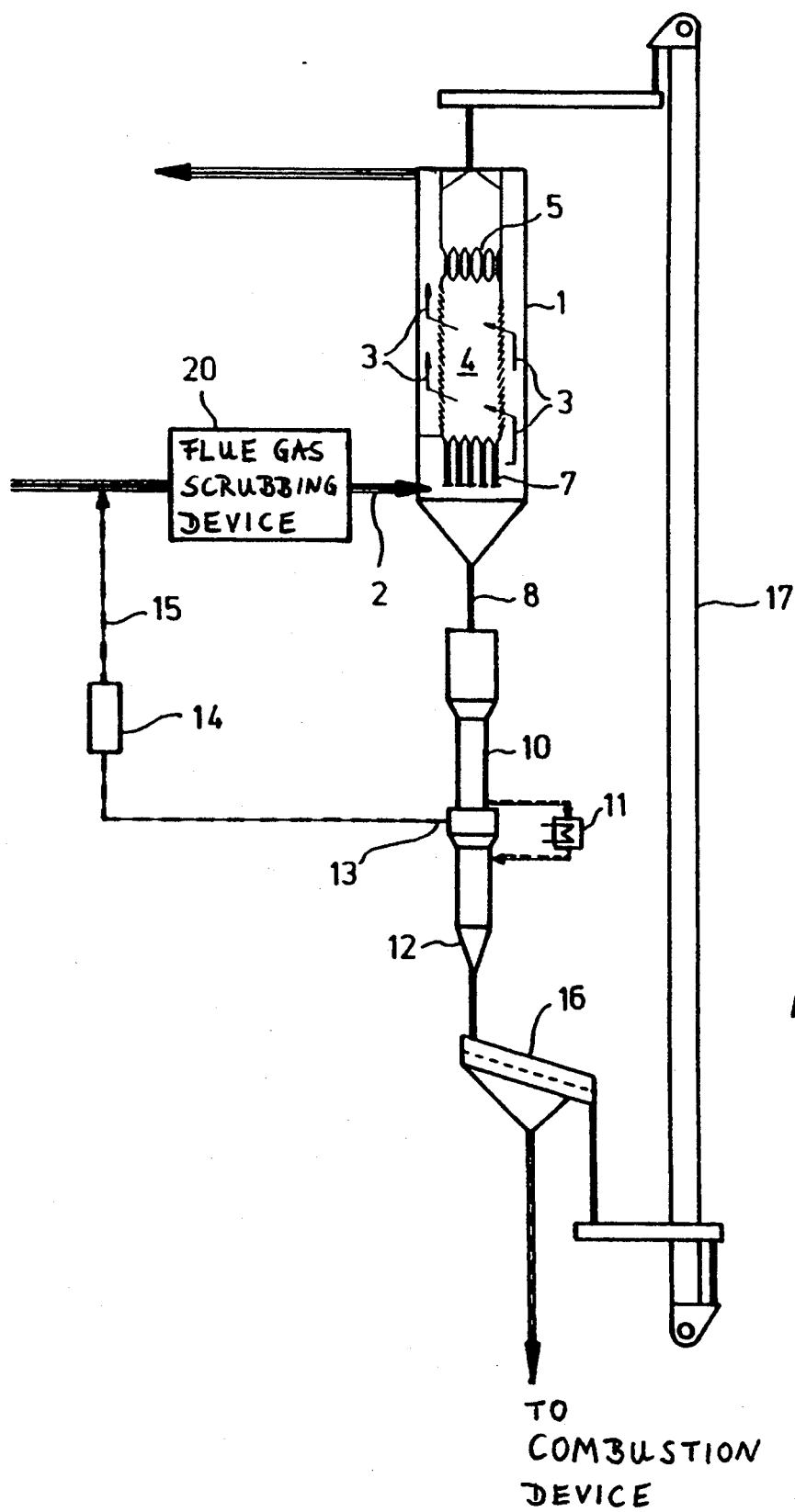

The adsorption medium reactor 1 (flue gas treatment reactor), schematically represented in the drawing of the described example, serves to separate sulfur oxides ($SO_2/SO_3$), hydrogen chloride (HCl), hydrogen fluoride (HF), chloro-organic components, especially dioxins and furanes, and heavy metals from the flue gases. It is positioned at a suitable location, in general behind the flue gas scrubbing apparatus 20, within the flue gas line 2. The illustrated adsorption medium reactor 1 represents a number of adsorption and/or reduction stages of any desired number which can be serially and/or parallel connected within the flue gas stream. In the shown embodiment the adsorption medium reactor is a so-called transverse flow reactor in which the flue gas stream flows in the direction of arrows 3 transverse through a catalytically active carbon-containing adsorption medium bed 4. The pellet-shaped, lumpy, or granular adsorption medium is filled and distributed as uniformly as possible over the cross-section of the reactor via the feeding device 5 in order to form the adsorption medium bed 4. The adsorption medium travels vertically from the top to the bottom. Spent adsorption medium is removed via a removal device 7 comprised of a plurality of removing pipes 7 at the bottom of the reactor 1. The removing pipes are closeable by suitable means so that the removal of spent adsorption medium can be performed continuously or discontinuously, i.e., in batches.

Spent adsorption medium is guided from the reactor 1 via a conveying device 8, represented as a simple conduit, into a thermal regeneration apparatus 10. In the thermal regeneration apparatus 10 the pollutant-laden adsorption medium is heat-treated for a suitable treatment period at such a temperature that a desorption process occurs in which the pollutants are separated from the adsorption medium, especially such that dioxins are decomposed, gaseous components such as $SO_2$, HCl, HF, etc. are released and low boiling heavy metal, especially mercury, is vaporized. The heat supplied to the thermal regeneration apparatus, in the following also called desorber, is supplied via a heat circuit 11, the heat energy of which in general is derived from a combustion unit of the device, i.e., the exhaust gas of the combustion unit is not directly used for heating the adsorption medium.

The desorber has a removal unit 12 at the bottom via which the essentially pollutant-free adsorption medium is removed for further treatment, respectively, combustion, and further has a gas and steam removing device 13 for removing the pollutant-rich desorption gas. The removing device 13 is connected to an adsorption apparatus 14 which primarily serves to remove mercury vapors from the desorption gas. Only after this treatment, the pollutant-rich but mercury-free desorption gas can be recycled via a line 15 into the flue gas stream before the flue gas scrubbing apparatus 20. The mercury removal within the adsorption apparatus 14 has the advantage that the desorption gas free of mercury can not additionally enrich the adsorption medium within the reactor 1 with mercury.

In general, the adsorption medium present at the removal unit 12 of the desorber 10 and freed of pollutants is burned within a combustion device, not represented in the drawing. With high-quality stone coal containing adsorption media, for example, in the form of stone coal pellets, at least a portion of the adsorption medium amount treated within the desorber 10, optionally after screening (16) and after further regeneration and replacement of losses, can be returned into the flue gas treatment circuit. For returning the thermally regenerated carbon-containing adsorption medium a conveying device 17 is provided which returns the granular or pellet-type adsorption media particles from the top via the feeding device 5 into the reactor 1.

In principle, the invention can be used with the same advantages with all adsorption and reduction stages which operate with carbon-containing adsorption media. The exact embodiment of the conveying devices 8 and 17 as well as of the feeding and removing devices determining the adsorption medium throughput are not represented in the drawing and are of no decisive consequence for the invention. It is however important that temperature and treatment time within the desorber 10 are adjusted such that the desorption process is reliably performed and the load of pollutants in the adsorption medium is almost entirely removed.

The present invention is, of course, in no way restricted to the specific disclosure of the specification and drawings, but also encompasses any modifications within the scope of the appended claims.

I claim:

1. A method for purifying a carbon-containing adsorption medium used for treating flue gases within a flue gas scrubbing process, said method comprising the steps of:
   introducing the adsorption medium into an adsorption medium reactor where the adsorption medium adsorbs low boiling heavy metals and pollutants, selected from the group consisting of sulfur oxides, hydrogen chloride, hydrogen fluoride, and chloro-organic components, from the flue gas;
   removing the adsorption medium laden with low boiling heavy metals and pollutants from the adsorption medium reactor and conveying the adsorption medium into a desorber;
   desorbing at temperatures of 350° to 650° C. the low boiling heavy metals and pollutants in the desorber, resulting in a desorption gas, wherein in said desorbing step the low boiling heavy metals are vaporized and the pollutants are released from the adsorption medium and partially decomposed;
   feeding the desorption gas into an adsorption apparatus where the low boiling heavy metals are removed from the desorption gas by adsorption; and
   recycling the desorption gas substantially free of the low boiling heavy metals into the flue gas scrubbing process.

2. A method according to claim 1, further comprising the step of:
   burning he adsorption medium after said step of desorbing.

3. A method according to claim 1, further comprising the step of:
   returning the adsorption medium via a conveying device into the adsorption medium reactor after said desorbing step.

4. A method according to claim 3, further comprising the step of:
   replacing amounts of lost adsorption medium within the conveying device.

5. A method according to claim 3, further comprising the step of:
   replacing amounts of lost adsorption medium directly within the adsorption medium reactor.

6. A device for purifying a carbon-containing adsorption medium used for treating a flue gas stream within a flue gas scrubbing process, said device comprising:
   an adsorption medium reactor receiving an adsorption medium for adsorbing pollutants from the flue gas stream, said adsorption medium reactor comprising a removal device for removing the adsorption medium laden with low boiling heavy metals and pollutants, selected from the group consisting of sulfur oxides, hydrogen chloride, hydrogen fluoride, and chloro-organic components, from said adsorption medium reactor;
   a desorber, connected to said removal device of said adsorption medium reactor, for desorbing at temperatures of 350° to 650° C. the pollutants from the adsorption medium as a desorption gas, wherein the low boiling heavy metals are vaporized and the pollutants are released from the adsorption medium and optionally decomposed, said desorber comprising:
   a) a heating means for indirectly heating said desorber,
   b) a removal unit for removing the adsorption medium from the desorber, and
   c) a gas and steam removing device for removing the desorption gas form the desorber; and
   an adsorption apparatus having an inlet and an outlet, said inlet connected to said gas and steam removing device, for removing by adsorption mercury from the desorption gas, wherein the desorption gas substantially free of mercury is subjected to further treatment.

7. A device according to claim 6, further comprising a return line connected to said outlet of said adsorption apparatus for returning the desorption gas into the flue gas stream upstream of said adsorption medium reactor.

8. A device according to claim 6, further comprising a combustion device connected to said removal unit of said thermal regeneration apparatus.

9. A device according to claim 6, further comprising a conveying device connected to said removal unit of said thermal regeneration apparatus.

10. A device according to claim 6, wherein said removal unit is located at a bottom portion of said thermal regeneration apparatus.

11. A method for purifying a carbon-containing adsorption medium used for treating flue gases, said method comprising the steps of:
    introducing the adsorption medium into an adsorption medium reactor where the adsorption medium adsorbs low boiling heavy metals and pollutants, selected from the group consisting of sulfur oxides, hydrogen chloride, hydrogen fluoride, and chloro-organic components, from the flue gas;
    removing the adsorption medium laden with pollutants from the adsorption medium reactor and conveying the adsorption medium into a desorber;
    desorbing at temperatures of 350° to 650° C. the pollutants in the desorber, resulting in a desorption gas, wherein in said desorbing step the low boiling heavy metals are vaporized and the pollutants are released from the adsorption medium and partially decomposed;
    feeding the desorption gas into an adsorption apparatus where the low boiling heavy metals are removed from the desorption gas by adsorption.

12. A method according to claim 11, wherein in said step of subjecting the desorption gas to further treatment the desorption gas is recycled into the flue gas scrubbing process.

13. A device for purifying a carbon-containing adsorption medium used for treating a flue gas stream, said device comprising:
    an adsorption medium reactor receiving an adsorption medium for adsorbing pollutants from the flue gas stream, said adsorption medium reactor comprising a removal device for removing the adsorption medium laden with low boiling heavy metals and pollutants, selected from the group consisting of sulfur oxides, hydrogen chloride, hydrogen fluoride, and chloro-organic components, from said adsorption medium reactor;

a desorber, connected to said removal device of said adsorption medium reactor, for desorbing at temperatures of 350° to 650° C. the pollutants from the adsorption medium as a desorption gas, wherein the low boiling heavy metals are vaporized and the pollutants are released from the adsorption medium and optionally decomposed, said desorber comprising:

a) a heating means for indirectly heating said desorber, b) a removal un it for removing the adsorption medium from the desorber, and c) a gas and steam removing device for removing the desorption gas form the desorber;

an adsorption apparatus having an inlet and an outlet, said inlet connected to said gas and steam removing device, for removing by adsorption mercury from the desorption gas, wherein the desorption gas substantially free of mercury is subjected to further treatment;

a flue gas scrubbing apparatus positioned upstream of said adsorption medium reactor; and a return line connected to said outlet of said adsorption apparatus for returning the desorption gas into the flue gas stream upstream of said flue gas scrubbing apparatus.

* * * * *